United States Patent

Katayama et al.

[11] Patent Number: 5,954,920
[45] Date of Patent: Sep. 21, 1999

[54] PAPER COMPRISING AROMATIC POLYESTER AND PROCESS FOR PRODUCING THE SAME

[75] Inventors: Takashi Katayama; Junyo Nakakawa; Shoji Asano, all of Kurashiki, Japan

[73] Assignee: Kuraray Co., Ltd., Kurashiki, Japan

[21] Appl. No.: 08/460,880

[22] Filed: Jun. 5, 1995

[30] Foreign Application Priority Data

Jun. 7, 1994  [JP]  Japan ................................. 6-125327
Nov. 29, 1994 [JP]  Japan ................................. 6-294204

[51] Int. Cl.⁶ ............................................. D21H 13/24
[52] U.S. Cl. ........................ 162/157.3; 162/146; 162/138
[58] Field of Search ........................... 162/146, 138, 162/157.2, 157.3, 164.3; 264/141, 442, 143, 140, 176.1; 528/127

[56] References Cited

U.S. PATENT DOCUMENTS

| | | | |
|---|---|---|---|
| 4,330,457 | 5/1982 | East et al. ................................ | 524/602 |
| 4,395,307 | 7/1983 | Kastelic et al. ....................... | 162/157.3 |
| 4,529,481 | 7/1985 | Yoshida et al. ....................... | 162/157.3 |
| 4,857,148 | 8/1989 | Hawkins ............................... | 162/157.2 |
| 5,021,123 | 6/1991 | Sweeny ................................. | 162/157.3 |
| 5,126,012 | 6/1992 | Hendren et al. ....................... | 162/146 |
| 5,431,782 | 7/1995 | Cassat ................................... | 162/145 |
| 5,454,910 | 10/1995 | Yoon et al. ........................... | 162/157.3 |

FOREIGN PATENT DOCUMENTS

| | | |
|---|---|---|
| 0 167 682 | 1/1986 | European Pat. Off. . |
| 56-315 | 1/1981 | Japan . |
| 60-239600 | 11/1985 | Japan . |

Primary Examiner—Donald E. Czaja
Assistant Examiner—Jose A. Fortuna
Attorney, Agent, or Firm—Oblon, Spivak, McClelland, Maier & Neustadt, P.C.

[57] ABSTRACT

A paper comprises 5 to 100% by weight of a thermotropic aromatic polyester pulp with constituting fibers having an average fiber diameter of at least 0.1 $\mu$m and less than 10 $\mu$m and substantially no branches, and is obtained by a process which comprises wet forming a paper material comprising 5 to 100% by weight of the above pulp which is obtained from sea-islands fibers comprising an islands component of the thermotropic aromatic polyester and a sea component of another polymer by dissolving or decomposing off the sea component before or after cutting the fibers to an average length of not more than 5 mm. The paper has excellent strength, texture, electric insulation property and like properties.

20 Claims, 1 Drawing Sheet

10 μm

PAPER COMPRISING AROMATIC POLYESTER AND PROCESS FOR PRODUCING THE SAME

BACKGROUND OF THE INVENTION

1. Field of the Invention

The present invention relates to a paper comprising a thermotropic aromatic polyester and to a process for producing the same. More specifically, the present invention relates to a paper being readily wet formable and having excellent strength and texture and, at the same time, being dense and having excellent electric insulation property, and to a process for producing the same.

2. Description of the Prior Art

Known pulps capable of forming aromatic polyester paper include one obtained by melt processing this type of polyester and fibrillizing the melt by applying shearing force (Japanese Patent Application Laid-open No. 239600/1985) and one obtained by alkali-treating a mixture of an aromatic polyester and an alkali-soluble organic compound to remove the latter and beating the obtained hollow fiber agglomerates (Japanese Patent Application Laid-open No. 315/1981).

Although conventional thermotropic polyester fibers, having high molecular orientation, can comparatively readily fibrillize under a shearing force, they cause the problems of sticking or fusing together and the beating for the fibrillation requires much time and labor due to their high strength. In addition, the obtained pulps, containing a considerable amount of block-wise pulp matter, cannot be readily wet formed, thereby yielding papers having insufficient strength and poor texture, as well as insufficient electric insulation property.

With these polyester fibers, repeated beating is required for obtaining a wet formable pulp and inevitably produces powdery matter, which will, on the succeeding wet forming, tend to clog the piping and damage the process stability. Besides, since almost no long fibrils can be obtained, the resulting pulp is lightly entangled and only produces paper with low strength. The repeated beating, being still unable to remove block-wise pulp matter having large fiber diameters, can hardly provide a paper with high strength and good texture. Furthermore, it has been difficult to wet form thin paper therefrom.

SUMMARY OF THE INVENTION

Accordingly, an object of the present invention is to solve the above problems and provide a thermotropic aromatic polyester paper being readily wet formable and having excellent strength and texture.

Another object of the present invention is to provide a process for producing the above paper.

Still another object of the present invention is to provide an insulating paper having excellent insulation property and chemical resistance and low moisture absorption and being suitable for use in cooling medium compressors, printed wiring board substrates and the like.

The present invention provides a paper comprising 5 to 100% by weight of a thermotropic aromatic polyester pulp with constituting fibers having an average diameter of at least 0.1 $\mu$m and less than 10 $\mu$m and substantially no branches.

The present invention further provides a process for producing paper which comprises wet forming a paper material comprising 5 to 100% by weight of a pulp having an average fiber diameter of at least 0.1 $\mu$m and less than 10 $\mu$m and obtained from sea-islands fibers comprising an islands component of a thermotropic aromatic polyester and a sea component of another polymer by dissolving or decomposing off the sea component before or after cutting the fibers to an average length of not more than 5 mm.

This process can, without applying shearing force to a melt-formed body, provide therefrom a pulp with fibers having diameters dispersed only to a small extent and a nearly uniform length. The resulting pulp comprises fibers having substantially no branches (see FIG. 1) and thus clearly differs from conventional thermotropic polyester pulps obtained by beating formed bodies (see FIG. 2). The pulp used in the present invention, with constituting fibers having substantially no branches, is excellent in dispersibility on wet formation and can hence provides papers having good texture. The papers obtained are dense and highly airtight, thereby showing excellent insulation property.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
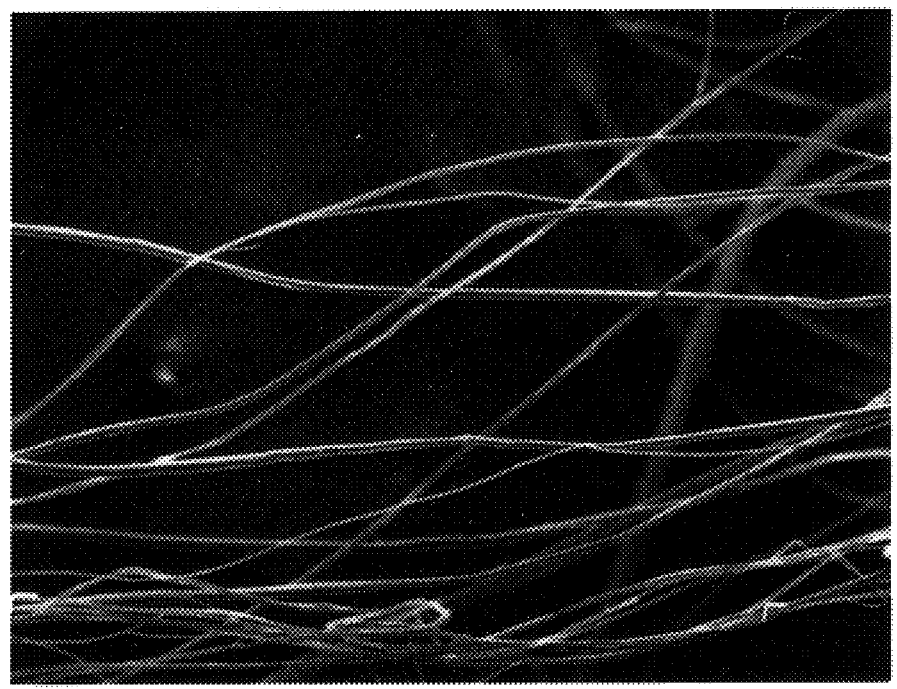
FIG. 1 is a scanning electron microphotograph of the pulp used in the present invention and with ultrafine fibers having substantially no branches.

Examples of the thermotropic-aromatic polyester used in the invention are polymers obtained from aromatic diols and aromatic dicarboxylic acids and aromatic hydroxycarboxylic acids, among which those comprising repeated units of formulas (1) through (12) are preferred.

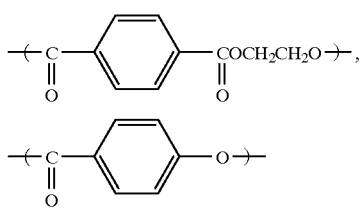

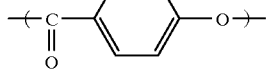

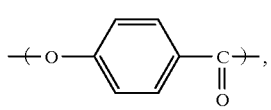

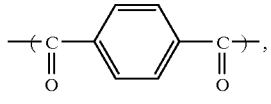

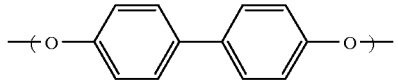

(3)
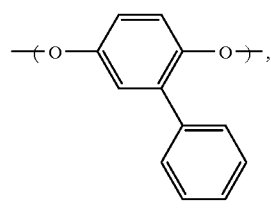
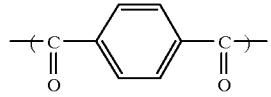
(4)
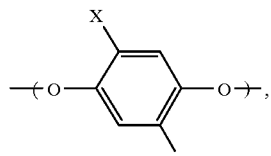
wherein X, X', Y and Y' are each H, Cl, Br or CH₃ and Z is
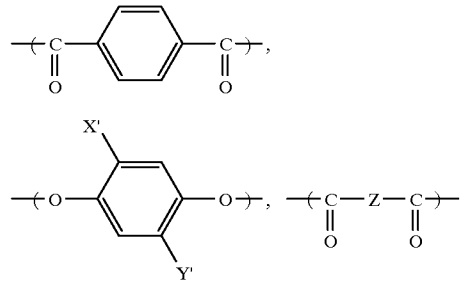
or
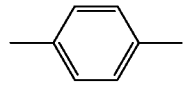
(5)
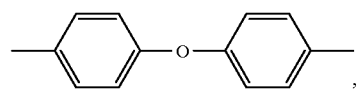
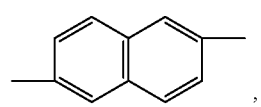
(6)
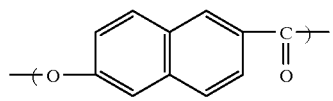
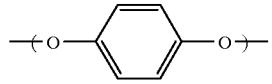
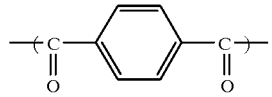
(7)
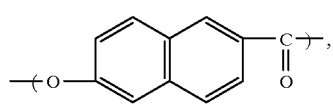
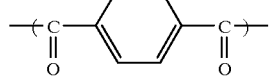
(8)
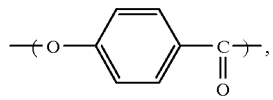
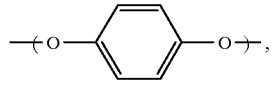
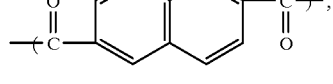
(9)
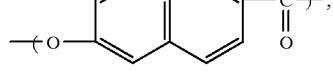
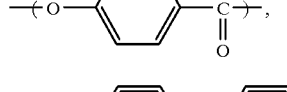
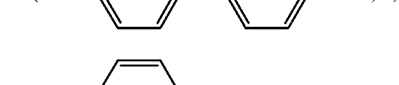
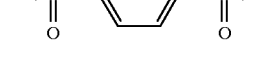

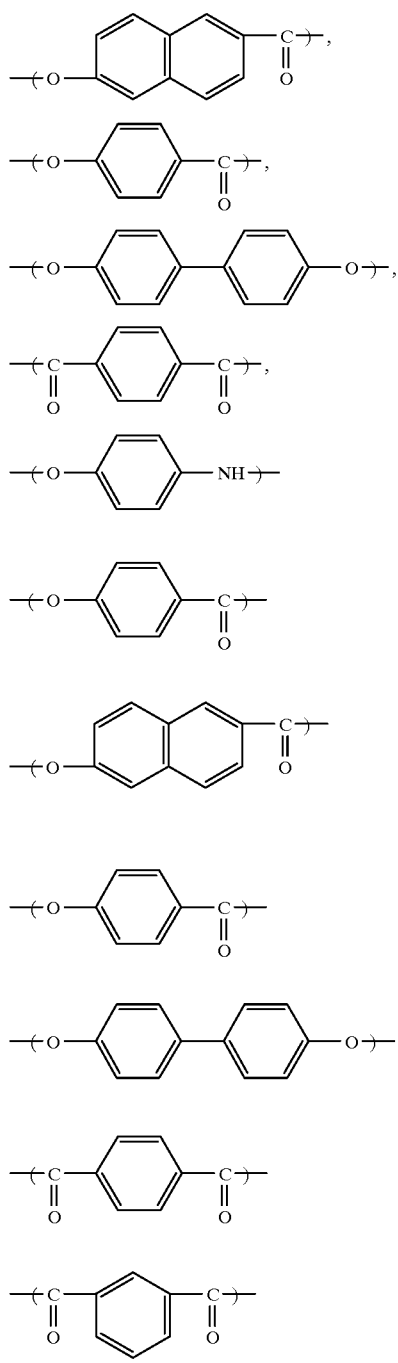

The thermotropic aromatic polyester preferably has a melting point (MP) of 260 to 380° C., more preferably 270 to 350° C. The melting point herein is determined as the peak temperature of the maximum endothermic peak of a sample as observed in a differential scanning calorimeter (DSC; for example TA3000 made by Mettler).

Particularly preferred examples of the polyester are thermotropic aromatic polyesters comprising structural units from p-hydroxybenzoic acid (A) and 2-hydroxy-6-naphthoic acid (B) in an amount of at least 80 mole % and more particularly those containing 5 to 45 mole % based on the total moles of (A) and (B) of component (B).

The term "thermotropic" (or "melt liquid-crystallizable") as referred to in the present invention means "capable of forming an optically anisotropic melt phase". This property can readily determined by any known method, for example one comprising heating a sample placed on a hot stage under a nitrogen atmosphere and observing the transmitted light.

The thermotropic aromatic polyesters usable in the invention may, suitably, contain additives such as titanium oxide, kaolin, silica, barium sulfate, carbon black, pigments, antioxidants, UV absorbers and light stabilizers.

Fibers constituting the pulp used in the invention should have an average diameter of at least 0.1 $\mu$m and less than 10 $\mu$m. Fibers having an average diameter of less than 0.1 $\mu$m hardly contribute to achievement of a paper strength satisfactory for practical use and cause a large flowing loss on paper making. In addition, it is very difficult to produce or separate such fibers alone. On the other hand, a pulp with fibers having an average diameter of at least 10 $\mu$m, which cannot entangle with each other so much, has markedly poor wet formability, thereby decreasing the paper strength and yielding a paper with poor texture. The pulp preferably has an average fiber diameter of 0.2 to 5 $\mu$m, more preferably 0.5 to 3 $\mu$m, from the viewpoint of wet formability and paper strength.

The pulp preferably has an average fiber length of 0.2 to 5 mm, particularly 0.5 to 2 mm. If the pulp is too short, the constituting fibers will be entangled only to a small extent, thereby often decreasing the paper strength and readily flowing off to cause a large loss. On the other hand, if the pulp is too long, the constituting fibers will tend, on wet forming, to be entangled into aggregates, thereby decreasing the wet formability and giving a paper with poor texture.

It is desirable that the pulp comprise fibers having an aspect ratio of 500 to 1,500, preferably 800 to 1,200 in view of dispersibility on wet formation and paper strength. The aspect ratio herein is defined to a quotient obtained by dividing the length A of a fiber of a pulp sample by the diameter B of a circle having the same area as the cross sectional area of the fiber.

Wet forming a paper material containing 5 to 100% by weight of the pulp can provide an excellent paper. The paper material may contain fibrous matter other than the pulp specified in the present invention comprising a thermotropic aromatic polyester and, if necessary, other polymers. From the viewpoint of heat resistance, low moisture absorption and like properties, it is desirable to prepare a paper comprising no other polymers than the thermotropic polyester and, in general, such components other than the thermotropic aromatic polyester may be contained in an amount of not more than 10% by weight, more preferably not more than 5% by weight.

While wet formation of the pulp alone can yield papers having excellent heat resistance, low moisture absorption and good texture, it is desirable, for obtaining still higher paper strength, to mix short fibers comprising a polymer having the same or different composition as that of the polymer constituting the pulp.

The short fibers to be mixed preferably has an average diameter of at least 10 $\mu$m and less than 25 $\mu$m, more preferably at least 12 $\mu$m and less than 20 $\mu$m. Too thick short fibers often lead to both poor wet formability and poor texture.

The short fibers (short cut fibers) to be mixed preferably has an average diameter of at least 10 $\mu$m and less than 25 $\mu$m, more preferably at least 12 $\mu$m and less than 20 $\mu$m. Too thick short fibers often lead to both poor wet formability and poor texture; readily entangle together into aggregates upon wet formation and often cause insufficient wet formability, paper strength and texture. The short fibers preferably have an average aspect ratio of 130 to 500, more preferably 250 to 300.

The short fibers are incorporated into the pulp material in an amount of preferably 1 to 95% by weight, more preferably 30 to 70% by weight.

The pulp used in the invention is characterized in that the constituting fibers have substantially no branches and that it contains substantially no block-wise pulp matter or powder. The pulp, having these features, is excellent in dispersibility in water and hence has good wet formability, thereby being capable of producing papers having good heat resistance, low moisture absorption, high paper strength and good texture. In particular, the resulting papers are dense and have good air resistance and, therefore, suitable for electric insulation purpose.

The obtained papers of the present invention preferably have an air resistance of at least 500 sec/100 cc, more preferably at least 1,000 sec/100 cc and most preferably at least 1,800 sec/100 cc. It can be said that papers with higher air resistance have better texture and higher density. The air resistance herein is an index of the degree of difficulty in passing air and determined in accordance with JIS C2111 with a Gurley permeability tester.

The papers of the present invention preferably has a dielectric strength of at least 10 kV/mm, more preferably at least 13 kV/mm. The dielectric strength herein means, when a sample is subjected to high ac voltage application, the voltage causing the sample to undergo dielectric breakdown and is, when the sample is tested at 10 points in accordance with JIS C2111, expressed in terms of an arithmetic mean of the 10 measurements.

The pulp used in the invention can be obtained by spinning a polymer blend containing a thermotropic aromatic polyester as the islands component, into sea-islands fibers and removing the sea component from the fibers. The usual melt spinning can hardly process a thermotropic polyester into ultrafine fibers having a diameter of less than 10 $\mu$m.

The term "sea-islands fibers" used in the invention means fibers in the cross section of which several tens to several hundreds of thousands of islands (of a thermotropic aromatic polyester) are present in a matrix of the sea component used.

The sea-islands fibers may be of any diameter or cross-sectional shape as long as they have been shaped through extrusion and have islands each extending to some length in the fiber axis direction, and may assume the form of fibers, strands, pellets or chips.

Thermotropic polyesters, which readily orient in the direction of fiber axis, tend to form length-wise continuous islands and will hence give comparatively long pulp fibers unless they are cut. Cutting may be conducted before removal of the sea component used and, while causing substantially no powder to form, yields a pulp having a early uniform fiber length. If powder be formed on cutting and mixed into the resulting pulp, it would clog the piping on wet formation to instabilize the production operation and cause the resulting paper to be of low strength.

The sea-islands fibers used in the invention preferably contain in their cross-section several tens to several hundreds of thousands, particularly several hundreds to several tens of thousands, of islands. The number of islands can be changed by adjusting the blend ratio of the two polymers, spinning temperature, shear rate on extrusion, spinning draft, melt viscosity and like conditions. For example, larger difference between the melt viscosities of the two components leads to smaller number of islands.

Since thermotropic aromatic polyesters undergo, on passing through nozzles, markedly high molecular orientation, it becomes therefore necessary, in order to spin sea-islands fibers stably, to apply a spinning draft of 1.1 to 40. It is desirable that the shear rate applied be 100 to 100,000 sec$^{-1}$, which provides the resulting islands component with a suitable diameter.

The blending of the sea component polymer and islands component polymer can be achieved by chip blending the two components, mixing the melts of the components through a static mixer, an extruder or the like, or like processes. It is desirable that the mixing ratio by weight between the sea component and islands component be in a range of 30:70 to 80:20, particularly in a range of 45:55 to 60:40. Although increasing the mixing ratio of a thermotropic aromaric polyester is more economical and efficient, a mixing ratio of the polyester exceeding 70% by weight causes it to become sea component and cannot produce a pulp usable in the present invention.

It may be possible to produce relatively thin fibers by preparing sheath-core composite fibers comprising a core component of a thermotropic aromatic polyester and then removing the sheath component. However, it is substantially difficult to produce by this process ultrafine fibers having an average diameter of less than 10 $\mu$m, in particular those having an average diameter of less than 5 $\mu$m. As a result, it is practically impossible to form the obtained pulp into paper on a commercial scale. If a paper be ever obtained, the paper should have a low airtightness and insulation resistance.

The pulp used in the invention can be produced by, for example, a process which comprises preparing sea-islands fibers comprising a sea component of a flexible thermoplastic polymer and an islands component of a melt liquid-crystallizable aromatic polyester and, before or after cutting them to a length of not more than 5 mm, dissolving or decomposing off the thermoplastic polymer with a good solvent therefor.

Any thermoplastic polymer can be used for the above purpose with no particular limitation and its preferred examples are polyethylene, polystyrene, polymethylstyrene, polypropylene, nylon 6, nylon 6-6, nylon 6-10, polycarbonates, alkali-etchable polymer and polyvinyl chloride. Among these examples polyethylene, polystyrene and nylon 6-6 are more preferred, since there can then readily be selected a solvent which is a poor solvent for the thermotropic aromatic polyester used and a poor solvent for these polymers. The most preferred is polystyrene, which can be dissolved with toluene at a room temperature in a short period of time. The use of toluene is recommended also because the resulting sea-islands fibers readily have a uniform distribution and diameter of the islands component.

Thermotropic polyesters have excellent chemical resistance, so that a variety of solvents can be used for the above purpose and the resulting pulps have excellent properties such as strength. With the thermoplastic polymer being polyethylene, it is desirable to use a solvent of cyclohexane or chloroform and treat the fibers at a temperature of at least 80° C. With polypropylene, treatment with a solvent of benzene, chloroform, toluene or the like at a temperature of 80° C. is recommended. For polystyrene, which is particularly preferred, it is possible to treat with toluene, xylene or the like at a room temperature, which is good for achieving high process stability.

These solvents may be used singly or as a mixed solvent. Extraction of the thermoplastic polymer used with a solvent makes it possible to recover and re-use the solvent and thus produce the intended pulp economically and efficiently. It is recommended to, after the solvent treatment of the fibers into ultrafine fibers, to wash them with water and dry.

It is also preferred, in view of the ease of producing sea-islands fibers, to employ a process which comprises producing them from a polymer blend comprising a sea component of an alkali-etchable polyester and an islands component of melt liquid-crystallizable aromatic polyester and then, before or cutting them to a length of not more than 5 mm, dissolving or decomposing off the alkali-etchable polyester.

The alkali-etchable polyester herein includes polyesters formed from a dicarboxylic acid and a diol, a hydroxycarboxylic acid or the like with no particular restrictions insofar as they have alkali decomposability and/or alkali solubility.

The alkali-etchable polymer used preferably has a ratio between its alkali dissolution rate and that of the thermotropic aromatic polyester used of at least 1,000, more preferably at least 3,000. Then, the alkali treatment can be conducted in a short period of time, whereby the thermotropic polyester, which has good alkali resistance, is minimally deteriorated or etched with the alkali used and gives a pulp with excellent properties such as strength. In addition, since the alkali-etchable polyester can be removed almost completely by the treatment with an alkali solution, there occurs in the succeeding processes such as heat treatment no such troubles as sticking together.

The alkali dissolution rate herein is determined by a test which comprises immersing a sample in a 20 g/l aqueous sodium hydroxide solution at a temperature of 98° C. and a bath ratio of 1:500 and dissolving the sample with stirring and is expressed in terms of the alkali dissolution rate constant K obtained by the following formula $$K=(10-R^{1/2})\times\{\gamma_0/(10t)\}$$

where

K alkali dissolution rate constant (cm/sec)

R=% by weight of insoluble matter after t seconds' immersion in aqueous alkali solution $\gamma_0$=radius of a fiber just after (t=0) immersion in aqueous alkali solution (cm)

t=time immersed in aqueous alkali solution (sec)

where $\gamma_0=(dr/\pi\cdot f\cdot\sigma\cdot 900000)^{1/2}$ where dr=denier of sample yarn σ=specific gravity of fiber f=number of filaments per yarn.

The alkali-etchable polyester used may contain a commercially available antioxidant (e.g. IRGANOX 1790 made by Ciba-Geigy and CYANOX 1790 made by American Cyanamide) to improve the heat resistance.

Preferred examples of alkali-etchable polyesters are copolyesters comprising the following structural units I through III

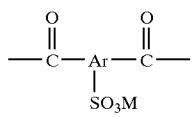
(I)

wherein Ar is a trivalent aromatic group and M is a metal atom, $$—O—(R^1—O)_m—\qquad\qquad(II)$$

wherein $R^1$ is an alkylene group and m is an average degree of polymerization of 10 to 100,

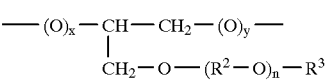
(III)

wherein $R^2$ is an alkylene group, $R^3$ is a hydrocarbon group having 1 to 18 carbon atoms, n is an average degree of polymerization of 10 to 100 and x and y each is 0 or 1.

Particularly preferred are copolyesters containing the structural units I through III in the following amounts: 0.5 to 10 mole % based on the moles of the total acid components constituting the copolyester of structural unit I and at least 1% by weight each of structural units II and III, with the total content of structural units II and III being 2 to 50% by weight of the copolyesters. These copolyesters have an alkali dissolution rate at least 1,000 times that of aromatic polyesters and can hence be treated with an alkali solution in a short time. More preferred among the above copolyesters are those containing structural unit I in an amount of 1 to 7 mole % based on the moles of the total acid components constituting the polyesters and structural units II and III in a total amount of 5 to 30% by weight based on the total weight of the polyesters.

If the contents of structural units I through III are too small, the alkali decomposability will sometimes become insufficient. Then, removal of the alkali etchable polyester takes a long time to cause the resulting pulp to be of deteriorated strength and like problems.

On the other hand, if the contents of the copolymerization components are too large, the spinnability will often decrease. Too high a content of structural unit I leads to a high viscosity, which readily causes gelation. Too high contents of structural units II and III decrease the viscosity, thereby often causing frequent filament breakage. Copolymerization of structural unit III in an appropriate amount permits the alkali decomposability and spinnability to increase markedly.

Examples of the trivalent aromatic group (Ar) in the dicarboxylic acid component I are benzenetoluyl group and naphthalenetoluyl group and preferred examples of the metal atom M are alkali metals such as sodium, potassium and lithium. The copolyester may contain a plurality of the dicarboxylic acid component I.

Examples of other carboxylic acid component constituting the copolyester are aromatic dicarboxylic acids, e.g. terephthalic acid, isophthalic acid, naphthalenedicarboxylic acid, biphenyldicarboxylic acid and diphenyl ether dicarboxylic acid; aromatic hydroxycarboxylic acids, e.g. β-hydroxyethoxybenzoic acid and p-oxybenzoic acid; aliphatic dicarboxylic acids; alicyclic dicarboxylic acids and tricarboxylic acids. These carboxylic acids may be used singly or in combination of two or more. It is desirable that at least 70 mole % of the total acid components constituting the copolyester be an aromatic dicarboxylic acid, in particular terephthalic acid.

It is desirable that $R^1$ present in the diol unit II be an alkylene group having 2 to 4 carbon atoms, preferably ethylene group and/or propylene group, in particular ethylene group, in view of alkali solubility. The average degree of polymerization, m, should be in a range of 10 to 100 and is preferably 20 to 80. An m of less than 10 leads to low alkali solubility, while that exceeding 100, which no longer increases the alkali solubility so much, tends to lead to the problem of coloring. Thus, preferred examples of the diol unit II are those from polyoxyethylene glycol, polyoxypropylene glycol and polyoxyethylene/polyoxypropylene glycol. These diol components may be used singly or in combination.

It is desirable that the copolyester further contain units from other diols, such as aliphatic diols and alicyclic diols. These other diol units may also be contained singly or in combination and, among the above, units from a linear alkylene glycol having 2 to 6 carbon atoms are preferred in view of fiber formability.

The $R^2$ in the branch unit III is preferably an alkylene group having 2 to 4 carbon atoms, more preferably ethylene group and/or propylene group, in particular ethylene group. Examples of the $R^3$ are linear or branched alkyl groups having 1 to 15 carbon atoms, cycloalkyl groups having 3 to 18 carbon atoms and aryl groups having 6 to 18 carbon atoms.

The degree of polymerization, n, is in a range of 10 to 100, preferably in a range of 20 to 80. An n of less than 10 leads to low alkali solubility, while that exceeding 100, which no longer increases the alkali solubility so much, causes the problem of coloring.

Concrete examples of polymers giving structural unit III are polyoxyethylene glycol-alkyl-glycidyl ether, polyoxyethylene glycol-alkyl-2,3-dihydroxypropyl ether, polyoxyethylene glycol-phenyl-glycidyl ether, polyoxyethylene glycol-phenyl-2,3-dihydroxypropyl ether, polyoxyethylene glycol-cyclohexyl-glycidyl ether and polyoxyethylene glycolcyclohexyl-2,3-dihydroxypropyl ether. These component may be contained in the copolyester (polymer A) singly or in combination.

Since the islands component according to the present invention comprises a thermotropic aromatic polyester having excellent alkali resistance, it can give, on alkali treatment, a pulp with ultrafine fibers having the intended diameter with no substantial change.

Dissolution and/or decomposition of the alkali-etchable polyester (sea component) may be conducted by any known method, such as immersion, dip-nipping or roller padding. Alkali treatment for this purpose is preferably conducted with an aqueous solution of a strong alkali, such as sodium hydroxide, potassium hydroxide, calcium hydroxide or trisodium phosphate, in a concentration of 2 to 60 g/l, more preferably 3 to 20 g/l in view of alkali solubility and erosion of fibers. When a weak alkali such as sodium carbonate, sodium silicate or sodium dihydrogenphosphate is used, the alkali concentration in the treating solution is preferably 5 to 200 g/l, more preferably 5 to 60 g/l. The above strong and weak alkali solutions may also contain a weak alkali and a strong alkali, respectively, and further contain a decomposition accelerating agent and the like. Addition of an alkali surfactant is preferable, since it accelerates penetration of the alkali into fibers.

The alkali treatment is conducted preferably at a temperature of 70 to 100° C. A temperature of lower than 70° C. requires a too long treating time, while one exceeding 100° C. tends to erode or degrade the remaining thermotropic aromatic polyester (polymer B) and requires an autoclave and like equipment. After the sea-islands fibers have been treated with alkali, the obtained ultrafine fibers are suitably neutralized, washed with water and dried.

If a trace amount of residual alkali causes a problem, it is desirable to employ the afore-described process of treating with a non-alkaline solvent sea-islands fibers comprising a sea component of a thermoplastic polymer.

Since, in this case also, the thermotropic aromatic polyester used has excellent resistance to chemicals, it can give, on treatment with the solvent, a pulp with ultrafine fibers having any optional diameter, which remains substantially the same before and after removal of the sea component.

The pulp used in the present invention is obtained by cutting to a length of not more than 5 mm, preferably not more than 3 mm and more preferably in a range of 1 to 2 mm. The cutting may be conducted either before or after removal of the sea component. It, however, is preferably conducted before the removal, since thick fibers can be cut more easily. The cutting can be done with a cutter, pelletizer, granulator or similar apparatuses.

The pulp thus obtained may incorporate a dispersing agent. Examples of usable dispersing agents include, but not limited thereto, polyetheresters, C8-sulfosuccinate, polyoxyethylene (POE).nonylphenolether.sulfate.sodium, POE.nonylphenol, POE.oleylether, fluorine-based compounds and modified silicones. These dispersing agent may be used singly or in combination of two or more, in an amount of preferably not more than 10% by weight, more preferably not more than 5% by weight. It is also possible, in order to increase the dispersibility of the pulp, to treat the pulp as being dry, wet or wet with addition of a dispersing agent, in a pulper, refiner, beater or the like, thereby loosening the entanglement of the ultrafine fibers.

The key feature of the process of the present invention is to make paper from a thermotropic aromatic polyester pulp comprising ultrafine fibers having an average diameter of at least 0.1 μm and less than 10 μm obtained by removing the sea component of sea-islands fibers. The object of the present invention cannot be achieved by removing the sea component after making paper from sea-islands fibers. That is, sea-islands fibers, having a large diameter, have by themselves very poor wet formability and give a paper having low airtightness and poor texture.

The weight of the paper of the present invention is suitably set according to its use and may in general be in a range of 20 to 200 g/m² for a variety of uses.

The paper of the invention can be provided with a high strength of breaking length of at least 4 km, in particular at least 4.5 km. To achieve a still higher strength, it is desirable to heat treat the pulps, cut fibers and paper, which can produce a paper having a breaking length of at least 6 km, in particular at least 7 km.

Although the heat treatment may be conducted either before or after removal of the sea component, it is preferably conducted before the removal to suppress sticking between ultrafine fibers. It is also possible to, after heat treating the obtained paper lightly with calender rolls, apply further heat treatment to increase the strength and raise the melting point.

The heat treatment can be carried out by heat radiation with hot plates, infrared heater or the like, direct heating by contact with hot roll, hot plate or the like, or internal heating with high frequency wave or the like, or by like methods. When a heating medium gas is used, it may be an inert gas such as nitrogen, a mixed gas of nitrogen with oxygen, carbon dioxide or the like, air or the like.

It is desirable that the heat treating atmosphere be a gas having a dew point of not more than −10° C., preferably not more than −40° C. Desirable heat treating temperature condition follows a successive temperature elevation pattern within a range of, based on the melting point (MP), MP−60° C. to MP+20° C. and starting at MP−40° C. The melting point herein means, when a sample is heated in a differential scanning calorimeter, a temperature at which the maximum endothermic peak appears.

The heat treatment may be applied to the pulp or sea-islands fibers as being either under or no tension and in the form of skeins, cheeses, tow (placed on a wire net), pellets, strands, sheets, pulps, staples or the like.

While the paper of the present invention can be used as it is, it may, depending on the use, subjected to surface polishing with a heat calender, heat press or the like. In particular, calendering a paper obtained from a pulp which has not been heat treated can provide the paper with good luster and improved strength.

The calendering temperature is preferably set at 200 to 300° C., particularly 210 to 270° C. While higher calendering temperatures can give higher breaking strength, dielectric breakdown strength and the like, lower ones give better process stability. The linear pressure on calendering is suitably set at 50 to 200 kg/cm. As a calender roll, an elastic roll (e.g. paper roll, cotton roll and rubber roll) or steel roll may be used.

Although the paper is made with the pulp alone, mixing other cut fibers is desirable when the end-use requires still higher strength.

The short cut fibers to be mixed for this purpose is desirably thermotropic aromatic polyester fibers, which are obtainable by the usual melt spinning. It is also possible to use fibers obtained by preparing sheath-core composite fibers or the like containing a thermotropic polyester as one component and then removing the other component. Mixing short fibers obtained by cutting these fibers can produce reinforcement effect, which is marked when they comprise a thermotropic aromatic polyester. Heat treatment can be conducted in the same manner as for the sea-islands fiber.

The papers according to the present invention, having excellent characteristics including high strength, high modulus, low moisture absorption, good heat resistance and good chemical resistance, can be used in various fields. For example, they can be used in the field of industrial materials and are particularly suitable for antifriction materials such as brake lining, crutch facing and bearing, packing materials, gaskets, filters, polishing materials, insulating paper, heat resistant paper, speaker cone, wiping cloth, resin reinforcing material, honeycomb and masking tape.

The papers of the present invention, using a pulp with fibers having substantially no branches, have not only high strength, good heat resistance and low moisture absorption but also, in particular, high density and air resistance, thereby exhibiting excellent properties as insulating paper. The insulating paper can be used, for example, for cooling medium compressors and printed wiring boards. The papers of the present invention use thermotropic polyesters, which have far lower moisture absorption as compared with aramids, and can hence show excellent insulation property. Namely, comparing with the papers of the present invention, aramid paper shows low surface resistivity especially after immersed in aqueous medium due to a high water regain, and is hence poor in insulation property. Furthermore, since it has a larger dimensional change, aramid paper is not suitably applied to a purpose requiring severe dimensional stability.

Thermotropic aromatic polyesters are originally excellent in heat resistance, chemical resistance and low moisture absorption and hence papers using pulps obtained by beating such polyesters have also good properties. However, these papers, inevitably containing block-wise pulp matter, have poor texture and sometimes partly contain relatively large voids, thereby often having a low air resistance and insufficient insulation property. This problem has been solved by the present invention.

Other features of the invention will become apparent in the course of the following descriptions of exemplary embodiments which are given for illustration of the invention and are not intended to be limiting thereof.

EXAMPLES

In the Examples and Comparative Examples that follow, various properties were determined according to the below-described methods.

Logarithmic viscosity

A sample is dissolved in pentafluorophenol at 60 to 80° C. in a concentration of 0.1% by weight. The solution is tested for relative viscosity with an Ubbelohde viscometer in a constant temperature chamber at 60° C. The logarithmic viscosity is calculated by the following equation $$\eta inh = ln(\eta rel)/c$$

where c=polymer concentration (g/dl).

Intrinsic viscosity

Determined from viscosities of solutions of a sample in a 1/1 by weight phenol/tetrachloroethane mixed solvent measured in a constant temperature chamber at 30° C.

Melting point

In a DSC (e.g. TA3000 made by Mettler) 5 to 15 mg of a sample is placed. After being sealed in an aluminum pan, the sample is tested at a temperature elevation rate of 20° C./min while nitrogen is flown at 20 cc/min. The temperature at which the maximum endothermic peak appears is defined as the melting point (MP). If no distinct endothermic peak appeared at the 1st run, the sample is melted completely by heating at a temperature at least 50° C. higher than the expected endothermic peak temperature for about 3 minutes, then cooled to 50° C. at a cooling rate of 80° C./min and again tested at a temperature elevation rate of 20° C./min, to obtain the peak temperature.

Diameter and length of pulp fibers

A straight line is drawn on an electron microphotograph of a pulp sample. At least 20 fibers laying on the line are measured for the transversal width (diameter) and the average of the 20 measurements is calculated. Other optional 4 points on the photograph are tested for average diameter in the same manner. The arithmetic mean of the 5 average values is calculated.

The lengths of optional 10 fibers on an electron microphotograph of a pulp sample are measured and the average value is calculated. The photographs of other optional 4 points on the sample are taken and the average length values are obtained in the same manner. The arithmetic mean of the 5 average values is calculated.

The diameter and length of pulp fibers after being formed into paper and those of other short fibers mixed thereinto are also determined in the same manner.

Weight (g/m$^2$)

A 10 cm×10 cm paper sample is weighed on an electron balance (AE160 made by Mettler) and the weight is calculated by the following formula $$\text{Weight (g/m}^2\text{)} = W/0.01$$

where W=weight (g) of sample.

Breaking length (km)

A sample strip of 15-mm wide and 250-mm long is tested according to JIS P8113, and an average of breaking lengths of lengthwise and crosswise directions is taken as a value for this test.

Moisture absorption (%)

A 10 cm-square paper sample is dried under vacuum (120° C.×6 hours) and then allowed to stand in a desiccator conditioned at 20° C.×95% RH for 1 week. The weights before and after the conditioning are measured with an electron balance and the moisture absorption is calculated from the measurements by the following formula Water absorption (%)=(W−W$_0$)/W$_0$×100 where

W$_0$=weight after drying,

W=weight after conditioning.

Dielectric strength (kV/mm)

A paper sample is tested at 10 points for dielectric strength according to JIS C2111 and the average value is calculated.

Air resistance (sec/100 cc)

Three paper samples are tested with a Gurley permeability tester according to JIS C2111 (maximum value: 1,800 sec/100 cc) and an arithmetical mean of the three is shown as an air resistance.

Wet formability

A pulp sample is tested with a hand sheet testing machine (made by Kumagai Rikikougyou Co., Ltd.) and evaluated in terms of the following rating.

○: has good dispersibility in water and high strength when wet (on wet formation) and is readily formable into paper, Δ: has a little poor dispersibility in water and low strength when wet (on wet formation), but is wet formable relatively readily, X : has poor dispersibility in water, thereby forming aggregates, and low strength when wet (on wet formation) to cause the problems of ready breakage, and is thus not readily wet formable.

Examples 1 through 3

There was used a thermotropic polyester containing p-hydroxybenzoic acid component and 2-hydroxy-6-naphthoic acid component in a molar ratio of 73/27 and having a melting point (MP) of 280° C. and a logarithmic viscosity of 5.7 dl/g.

There was used an alkali-etchable copolyester containing units (I) from dimethyl sodium 5-sulfoisophthalate in an amount of 2.5 mole % based on the moles of the total acid components constituting the copolyester, units (II) from a polyethylene glycol having a molecular weight of 2,000 and units (III) from a polyoxyethylene glycidyl ether as represented by the following formula each in an amount of 10% by weight of the copolyester, with the rest being units from terephthalic acid and ethylene glycol (intrinsic viscosity: 0.58 dl/g).

The rate between the alkali dissolution rates of the two polymers was 5,800. The copolyester contained an antioxidant (CYANOX 1790, made by American Cyanamid) in an amount of 5% by weight based on the total weight of the polyethylene glycol and polyoxyethylene glycidyl ether).

The same copolymerization components and antioxidant were used in the Examples 2 through 16 and Comparative Examples 1 through 4 which are to be described later herein.

The alkali-etchable polyester (polymer A) and the thermotropic polyester (polymer B) were melt blended in a ratio of 50:50 through an extruder, sent to a spinning head with a gear pump and spun under the conditions of a head temperature of 320° C., a take-up speed of 300 m/min and a draft of 11, into a sea-islands filament yarn of 1,500 d/100 filaments having a number of islands of about 500.

The yarn thus obtained was cut with a cutter to a fiber length of about 1.5 mm and the cut fibers were immersed in a boiling 40 g/l aqueous sodium hydroxide solution for 10 minutes. The fibers were then transferred onto a gauze, neutralized with acetic acid and washed with water for 30 minutes, to give a pulp.

Observation of the pulp thus obtained in a scanning electron micrometer (SEM) revealed that fibers constituting the pulp had no substantial branches and had an average diameter and length of about 1 μm (0.2 to 5 μm) and about 1.5 mm, respectively. The pulp contained substantially no powder or fibers with a very large diameter (see FIG. 1).

A paper making test was then conducted as follows.

There was used cut fibers obtained by melt spinning the same thermotropic aromatic polyester as the polymer A at a head temperature of 320° C., a take-up speed of 1,000 m/min and a draft of 22 into a yarn of 300 d/100 filaments (average filament diameter: 17 μm) and then cutting the yarn with a cutter to a length of 5 mm.

The pulp obtained by the above alkali etching and the cut fibers were thrown in water in amounts of 80% by weight and 20% by weight respectively and dispersed by stirring. The dispersion was wet formed through a 80-mesh stainless steel net to give various sheets having different weights.

The sheets were dried in a drum drier at a surface temperature of 120° C. The obtained papers were calendered at a temperature of 240° C. and a linear pressure of 70 kg/cm with an rubber upper-roller (hardness; 90°) and steel-lower roller. The properties of the thus treated papers are shown in Table 1.

Examples 4 through 6

Example 1 was repeated except that the mixing ratio between the pulp and the cut fibers was changed. The results are shown in Table 1.

Examples 7 and 8

Example 1 was repeated except that the calender roll temperature was changed. The results are shown in Table 1.

Example 9

Example 1 was repeated except that there was used cut fibers obtained by heat treating the cut fibers of Example 1 in an inert atmosphere (dehumidified nitrogen) at 220° C. for 4 hours and then at 280° C. for 10 hours. The results are shown in Table 1.

Examples 10 and 11

Example 1 was repeated except that there was used a pulp obtained by cutting the sea-islands yarn of Example 1 to a length of 0.1 mm (Example 10) or 6 mm (Example 11). The results are shown in Table 1.

Examples 12 and 13

Example 1 was repeated except that the cut length of the cut fibers was changed to 1 mm (Example 12) or 35 mm (Example 13). The results are shown in Table 1.

Examples 14

Example 1 was repeated except that the cut fibers used were changed to ones obtained by melt spinning the same thermotropic polyester as polymer A at a head temperature of 320° C., a take-up speed of 350 m/min and a draft of 8 into a yarn of 900 d/100 filaments (average filament diameter: 30 μm) and then cutting the yarn to a length of 5 mm. The results are shown in Table 1.

Examples 15

A pulp having an average fiber diameter and length of 0.7 μm (0.1 to 4 μm) and 1.5 mm, respectively, was prepared in the same manner as in Example 1 except that there was blended with the polymer A a polymer B containing previously depicted structural units C through F in a molar ratio of C:D:E:F=60:20:15:5 and that melt spinning was conducted at a head temperature of 330° C., a take-up speed of 550 m/min and a draft of 18.

Example 1 was further repeated except that the pulp thus prepared was used. The results are shown in Table 1.

Example 16

Pellets having an average diameter and length of 0.8 mm and 2 mm, respectively, were prepared by melt blending through an extruder the same blend of the thermotropic polyester and the alkali-etchable polyester as used in Example 1, extruding the blend through a nozzle having a diameter of 1 mm into a monofilament and then pelletizing the filament through a pelletizer.

The pellets thus obtained were immersed in a boiling 40 g/l aqueous sodium hydroxide solution for 20 minutes and then neutralized and washed in the same manner as in Example 1, to give a pulp. Observation of the obtained pulp in an SEM revealed that it contained substantially no powder or block-wise pulp matter and that ultrafine fibers constituting the pulp had substantially no branches. The fibers had an average diameter and length of 1.5 μm (0.5 to 4 μm) and about 2 mm, respectively.

The pulp was evaluated in the same manner as in Example 1. The results are shown in Table 1.

Example 17

Example 1 was repeated except that a polystyrene (STYRON 679, made by Asahi Chemical Industries) showing no melt anisotropy was used as the sea component, to obtain a sea-islands filament yarn of 1,500 d/100 filaments having a number of islands of about 300.

The sea-island filament yarn obtained was cut with a cutter to a fiber length of about 1.5 mm and the cut fibers were immersed in toluene, which is a poor solvent for thermotropic polyesters and good solvent for polystyrene at a room temperature for 1 hour.

The thus treated fibers were transferred onto a gauze and washed with water for 30 minutes, to give a pulp having an average diameter and length of about 1 μm (0.2 to 5 μm) and about 1.5 mm, respectively. The obtained pulp contained substantially no powder or aggregates.

The pulp was evaluated in the same manner as in Example 1. The results are shown in Table 1.

Comparative Example 1

Figure 2:
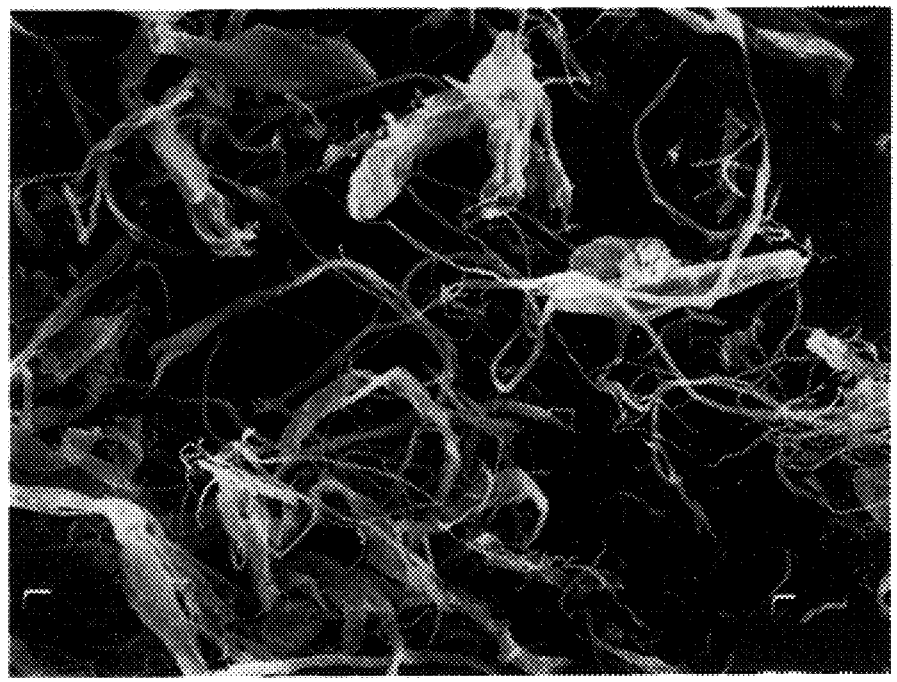
FIG. 2 is a scanning electron microphotograph of a conventional pulp obtained by beating shaped bodies.

The same thermotropic polyester as used in Example 1 was beaten and subjected to a strong shearing force in a refiner, to give a pulp. Observation in an SEM of the obtained pulp revealed that fibers constituting the pulp were not uniform in diameter and cross-sectional shape, while part of them had a diameter of about 1 μm though, and that the pulp contained also powder and block-wise pulp matter (see FIG. 2).

The paper making test of Example 1 was repeated except that the pulp thus obtained was used. The pulp, containing block-wise pulp matter showed poor wet formability and gave a paper having poor texture and, because of the presence of a number of voids, low electric insulation property. The results are shown in Table 1.

Comparative Example 2

A pulp was prepared by cutting the same sea-islands filament yarn as prepared in Example 1, to a length of 5 mm without alkali etching treatment. The thus obtained pulp was formed into a paper in the same manner as in Example 1. Thereafter, the paper was subjected to alkali etching and heat treated. The thus obtained paper had a poor texture and, perhaps because of the presence of many voids, a low strength and insulation property. The results are shown in Table 1.

Comparative Example 3

A sheath-core composite filament yarn was prepared as follows. The polymer A and the polymer B were fed to a multi-core sheath-core composite spinning machine with 2 extruders. The polymer A was melt kneaded in one of the extruders, weighed with a gear pump (I) and fed to the sheath side of the spinning machine. The polymer B was melt extruded through another extruder, weighed with a gear pump (II) and fed to the core side of the spinning machine. The weighing ratio between gear pumps I and II was 1:1. The sheath-core composite spinning machine had 100 sets of nozzles having cores.

The polymer flow were composite spun at a spinning head temperature of 300° C., a take-up speed of 1,200 m/min and a draft of 24. The obtained yarn was cut to a length of 1.5 mm and the cut fibers were alkali etched in the same manner as in Example 1, to give a pulp with fibers having an average diameter of 12 μm.

The pulp thus obtained was evaluated in the same manner as in Example 1. The pulp had low wet formability because of large fiber diameter and gave a paper with difficulty. The obtained paper, with the fibers entangled with each other only insufficiently, had a low strength and poor texture. The results are shown in Table 1.

Comparative Example 4

Example 1 was repeated except that the ultrafine fiber pulp was mixed in a small amount of 3%. Because of the small amount of the pulp, fibers were poorly entangled and the wet formability was poor. The obtained paper had a very poor texture. The results are shown in Table 1.

Comparative Example 5

A commercially available meta-based aramid paper (made by du Pont) was evaluated for the properties in the same manner. The results are shown in Table 1.

Example 18 and Comparative Example 6

The paper samples (10 cm×10 cm) used in Example 1 and Comparative Example 6 were dried at 80° C. for 24 hours under vacuum, cooled to 23° C. still under vacuum and then taken out of vacuum as reference samples (weight; W0 each). The reference sample was immersed in distilled water at 23° C. for 24 hours, wiped water on the surface with filter paper and then left standing for 2 minutes to prepare an immersed sample (weight; W1).

These reference and immersed samples were measured surface resistivity, dimensional change and water regain as follows. Results are listed in table 2.

Surface resistivity: measured for the reference and immersed samples respectively 1 minute after applying an electrical potential in accordance with JIS C2151.

Dimensional change: calculated by $(|L1-L0|)/L0 \times 100$, putting arithmetical mean (L1) of lengths of lengthwise and crosswise directions measured for the immersed sample, and that (L0) for the reference sample.

Water regain : calculated by $(W1-W0)/W0 \times 100$.

TABLE 2

| | Water regain (%) | Dimensional change (%) | Surface resistivity (Ω/□) reference sample | Surface resistivity (Ω/□) immersed sample |
|---|---|---|---|---|
| Example 18 | 0.1 | 0.1 | $7 \times 10^{15}$ | $5 \times 10^{14}$ |
| Comp. Ex. 6 | 31.5 | 0.8 | $5 \times 10^{15}$ | $8 \times 10^{12}$ |

Comparing with the paper of the present invention, aramid paper shows low surface resistivity especially in the immersed sample due to a high water regain, and is hence poor in electrically insulative property. Furthermore, since it has a larger dimensional change, aramid paper is not suitably applied to a purpose requiring severe dimensional stability.

Obviously, numerous modifications and variations of the invention are possible in light of the above teachings. It is therefore to be understood that within the scope of the appended claims the invention may be practiced otherwise than as specifically described herein.

What is claimed is:

1. A paper comprising 5 to 100% by weight of a polymeric pulp, said polymeric pulp comprising thermotropic aromatic polyester second fibers having an average diameter of at least 0.1 μm and less than 10 μm and substantially no branches,
    wherein said paper is prepared by a process comprising:
        forming a pulp by dissolving or decomposing a matrix component of first fibers,
        wherein each of said first fibers comprises,
            (i) a plurality of said second fibers comprising thermotropic aromatic polyester, and
            (ii) said matrix, surrounding said plurality of said second fibers, comprising a polymer, wherein said polymer is different from said thermotropic aromatic polyester; and
    wet forming said paper from said pulp.

2. The paper according to claim 1, wherein said second fibers have an average length of 0.2 to 5 mm.

3. The paper according to claim 1, further comprising 1 to 95% by weight of cut third fibers having an averaged diameter of at least 10 μm and less than 25 μm, said third fibers comprising a second thermotropic aromatic polyester, wherein said thermotropic aromatic polyester of said second fibers and said second thermotropic aromatic polyester of said third fibers are the same or different.

4. The paper according to claim 3, wherein said cut third fibers have an average fiber length of 2 to 30 mm.

5. The paper according to claim 1, wherein said thermotropic polyester comprise at least 80% of part comprising structural units from p-hydroxybenzoic acid (A) and 2-hydroxy-6-naphthoic acid (B).

TABLE 1

| | Content of pulp (%) | Weight (g/m²) | Roll temperature (° C.) | Breaking length (km) | Moisture absorption (%) | Dielectric strength (kV/mm) | Air resistance (sec/100 cc) | Wet formability |
|---|---|---|---|---|---|---|---|---|
| Example | | | | | | | | |
| 1 | 80 | 50 | 240 | 5.5 | 0.1 | 15.9 | 1,800 | ○ |
| 2 | 80 | 35 | 240 | 5.1 | 0.1 | 14.3 | 1,800 | ○ |
| 3 | 80 | 80 | 240 | 5.7 | 0.1 | 15.0 | 1,800 | ○ |
| 4 | 20 | 50 | 240 | 4.9 | 0.1 | 12.1 | 1,200 | |
| 5 | 60 | 50 | 240 | 6.1 | 0.1 | 13.6 | 1,600 | ○ |
| 6 | 100 | 50 | 240 | 4.6 | 0.1 | 15.2 | 1,800 | ○ |
| 7 | 80 | 50 | 220 | 4.4 | 0.1 | 11.4 | 1,000 | ○ |
| 8 | 80 | 50 | 260 | 7.1 | 0.1 | 17.2 | 1,800 | ○ |
| 9 | 80 | 50 | 240 | 8.2 | 0.1 | 15.2 | 1,800 | ○ |
| 10 | 80 | 50 | 240 | 4.2 | 0.1 | 14.4 | 1,800 | Δ |
| 11 | 80 | 50 | 240 | 4.1 | 0.1 | 10.9 | 600 | Δ |
| 12 | 80 | 50 | 240 | 4.7 | 0.1 | 14.8 | 1,800 | Δ |
| 13 | 80 | 50 | 240 | 5.0 | 0.1 | 12.5 | 1,100 | Δ |
| 14 | 80 | 50 | 240 | 4.6 | 0.1 | 11.9 | 900 | Δ |
| 15 | 80 | 50 | 240 | 6.9 | 0.1 | 13.6 | 1,800 | ○ |
| 16 | 80 | 50 | 240 | 5.5 | 0.1 | 15.5 | 1,800 | ○ |
| 17 | 80 | 50 | 240 | 5.6 | 0.1 | 14.8 | 1,800 | ○ |
| Comparative Example | | | | | | | | |
| 1 | 80 | 50 | 240 | 5.5 | 0.1 | 9.1 | 280 | x |
| 2 | 80 | 50 | 240 | 2.6 | 0.1 | 7.2 | 210 | x |
| 3 | 80 | 50 | 240 | 2.8 | 0.1 | 4.3 | 120 | x |
| 4 | 3 | 50 | 240 | 1.2 | 0.1 | 3.7 | 100 | x |
| 5 | Aramid paper (commercially available) | 50 | — | 7.4 | 4.8 | 16.2 | 1,800 | |

6. The paper according to claim 1, having an average breaking length of at least 4 km.

7. The paper according to claim 1, having a dielectric strength of at least 10 kV/mm.

8. The paper according to claim 1, wherein said paper is an insulating paper.

9. The paper of claim 8, wherein said paper has a surface resistivity of at least $5 \times 10^{14} \Omega$.

10. The paper of claim 1, wherein said second fibers have an average fiber diameter of 0.5–3 μm.

11. The paper of claim 1, wherein said paper has an air resistance of at least 1,000 sec/100 cc.

12. A process for producing paper, comprising:

forming a pulp by dissolving or decomposing a matrix component of first fibers, wherein each of said first fibers comprises,
(i) a plurality of second fibers comprising a thermotropic aromatic polyester, and
(ii) said matrix, surrounding said plurality of second fibers, comprising a polymer, wherein said polymer is different from said thermotropic aromatic polyester; and wet forming a paper from said pulp comprising 5–100% by weight of said second fibers;

wherein said second fibers have an average fiber diameter of at least 0.1 μm and less than 10 μm.

13. The process of claim 12, wherein said paper material further comprises 1 to 95% by weight of cut third fibers having and average diameter of at least 10 μm and less than 25 μm, said third fibers comprising a second thermotropic aromatic polyester,
wherein said thermotropic aromatic polyester of said second fibers and said second thermotropic aromatic polyester of said third fibers are the same or different.

14. The process of claim 12, wherein said second fibers have an average diameter of 0.5–3 μm.

15. The process of claim 12, wherein said polymer constituting said matrix is an alkali-etchable polyester.

16. The process of claim 15, wherein said alkali-etchable polyester has an alkali dissolution rate 1,000 times larger than that of the thermotropic polyester constituting the islands component.

17. The process of claim 15, wherein said alkali-etchable polyester is a copolyester comprising the following structural units I through III

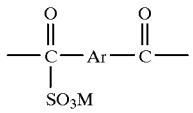

(I)

wherein Ar is a trivalent aromatic group and M is a metal atom,

(II)

wherein $R^1$ is an alkylene group and m is an average degree of polymerization of 10 to 100,

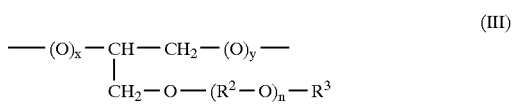

(III)

wherein $R^2$ is an alkylene group, $R^3$ is a hydrocarbon group having 1 to 18 carbon atoms, n is an average degree of polymerization of 10 to 100 and x and y each is 0 or 1.

18. A papermaking pulp, comprising second fibers comprising a thermotropic aromatic polyester, wherein said second fibers have a diameter of at least 0.1 μm and less than 10 μm, substantially no branches, and said pulp is prepared by a process comprising:

dissolving or decomposing a matrix component of first fibers, wherein each of said first fibers comprises,
(i) a plurality of said second fibers, and
(ii) said matrix, surrounding said plurality of said second fibers, comprising a polymer, wherein said polymer is different from said thermotropic aromatic polyester.

19. The pulp of claim 18, wherein said second fibers have an average length of 0.2 to 5 mm.

20. The pulp of claim 18, further comprising 1 to 95% by weight of cut third fibers having an averaged diameter of at least 10 μm and less than 25 μm, said third fibers comprising a second thermotropic aromatic polyester,
wherein said thermotropic aromatic polyester of said second fibers and said second thermotropic aromatic polyester of said third fibers are the same or different.

* * * * *

UNITED STATES PATENT AND TRADEMARK OFFICE
CERTIFICATE OF CORRECTION

PATENT NO. : 5,954,920

DATED        : September 21, 1999

INVENTOR(S): TAKASHI KATAYAMA, ET AL.

It is certified that an error appears in the above-identified patent and that said Letters Patent is hereby corrected as shown below:

Column 7, line 57 "early" should read --nearly--.

Column 9, line 42 "K alkali" should read --K=alkali--.

Signed and Sealed this

First Day of May, 2001

Attest:

NICHOLAS P. GODICI

Attesting Officer        Acting Director of the United States Patent and Trademark Office